United States Patent
Teodorescu et al.

(10) Patent No.: US 8,975,861 B2
(45) Date of Patent: Mar. 10, 2015

(54) POWER SOURCE FOR COMPLETION APPLICATIONS

(75) Inventors: Sorin G. Teodorescu, The Woodlands, TX (US); Lev Ring, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 452 days.

(21) Appl. No.: 13/409,975

(22) Filed: Mar. 1, 2012

(65) Prior Publication Data

US 2013/0229142 A1 Sep. 5, 2013

(51) Int. Cl.
*H02J 7/00* (2006.01)

(52) U.S. Cl.
USPC .................................................... 320/103

(58) Field of Classification Search
CPC ..................................................... H02J 7/0054
USPC ........................................................ 320/103
See application file for complete search history.

(56) References Cited

U.S. PATENT DOCUMENTS

| | | | |
|---|---|---|---|
| 3,666,961 A | 5/1972 | Bogue et al. | |
| 3,666,962 A | 5/1972 | Bogue et al. | |
| 3,693,068 A | 9/1972 | Bogue et al. | |
| 3,876,471 A | 4/1975 | Jones | |
| 6,360,823 B1 | 3/2002 | Ranson et al. | |
| 6,672,382 B2 | 1/2004 | Schultz et al. | |
| 7,009,363 B2 | 3/2006 | Beals et al. | |
| 7,258,169 B2 * | 8/2007 | Fripp et al. | 166/302 |
| 7,665,527 B2 * | 2/2010 | Loretz | 166/373 |
| 7,667,942 B2 * | 2/2010 | Boling | 361/103 |
| 7,729,860 B2 * | 6/2010 | Pabon et al. | 702/6 |
| 8,668,008 B2 * | 3/2014 | Rytlewski et al. | 166/250.01 |
| 2010/0021806 A1 | 1/2010 | Simon et al. | |
| 2011/0048910 A1 | 3/2011 | Allen et al. | |

FOREIGN PATENT DOCUMENTS

| | | |
|---|---|---|
| GB | 2336943 A | 11/1999 |
| WO | 01/40619 A1 | 6/2001 |
| WO | 2006/060673 A1 | 6/2006 |

OTHER PUBLICATIONS

PCT International Search Report and Written Opinion dated Feb. 25, 2014, for International Application No. PCT/US2013/025192.

* cited by examiner

*Primary Examiner* — Edward Tso
*Assistant Examiner* — Ramy Ramadan
(74) *Attorney, Agent, or Firm* — Patterson & Sheridan, LLP

(57) ABSTRACT

Methods and apparatus are provided for continuously powering tools downhole for extended periods of time, such as for the life of the producing well. Batteries may power the downhole tools, but traditionally, the batteries may last up to 2 years, and in some cases, up to 5 years may be reached with an optimized data sampling rate and power management scheme. After that time, operations may be halted temporarily for replacing the batteries. According to embodiments of the present invention, in contrast, rechargeable batteries may be utilized downhole to provide power to operate the tools, and rather than halting operations and retrieving the rechargeable batteries to the surface for recharging, reserve batteries may be used for recharging the rechargeable batteries. In many cases, these well tools may be designed to operate for a long period of time (e.g., around 10-20 years), depending on the life of the producing well.

31 Claims, 8 Drawing Sheets

POWER SOURCE FOR COMPLETION APPLICATIONS

BACKGROUND OF THE INVENTION

1. Field of the Invention

Embodiments of the invention generally relate to equipment utilized in conjunction with subterranean wells and, more particularly, to downhole electrical power systems.

2. Description of the Related Art

There are many uses for a downhole electrical power system. These uses include providing power to operate well tools, such as sensors, data storage devices, flow control devices, transmitters, receivers, etc. In many cases, these well tools may be designed to operate for a long period of time (e.g., around 10-20 years), depending on the life of the producing well.

Unfortunately, the downhole environment is frequently inhospitable to some types of power systems. For example, batteries typically cannot withstand wellbore temperatures for long. Typically, batteries for powering the well tools may last up to 2 years, and in some cases, up to 5 years may be reached with an optimized data sampling rate and power management scheme. In other traditional applications, electrical wires may be run down to the well tools, and the power may be provided from the surface. However, providing power from the surface may be costly, and the wires may most likely be replaced at certain planned intervals due to wear.

SUMMARY OF THE INVENTION

One embodiment of the present invention is an electrical power system located downhole in a wellbore. The system generally includes a rechargeable battery, a plurality of reserve batteries located downhole, and a control unit for monitoring a power-related parameter of the rechargeable battery. The control unit is typically configured to determine the power-related parameter of the rechargeable battery is below a threshold, activate one or more of the plurality of reserve batteries, and use the one or more activated reserve batteries for recharging the rechargeable battery.

Another embodiment of the present invention provides a method. The method generally includes determining a power-related parameter of a rechargeable battery of an electrical power system located downhole in a wellbore is below a threshold, activating one or more of a plurality reserve batteries located downhole, and using the one or more activated reserve batteries for recharging the rechargeable battery.

Another embodiment of the present invention is an electrical power system located downhole in a wellbore. The system generally includes a plurality of reserve batteries located downhole, and a control unit. The control unit is typically configured to power one or more downhole tools with one or more of the reserve batteries, determine a power-related parameter of the one or more of the plurality of reserve batteries is below a threshold, activate one or more other reserve batteries of the plurality of reserve batteries, and power the one or more downhole tools with the one or more activated reserve batteries.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide methods and apparatus for continuously powering tools downhole for extended periods of time, such as for the life of the producing well.

Figure 1:
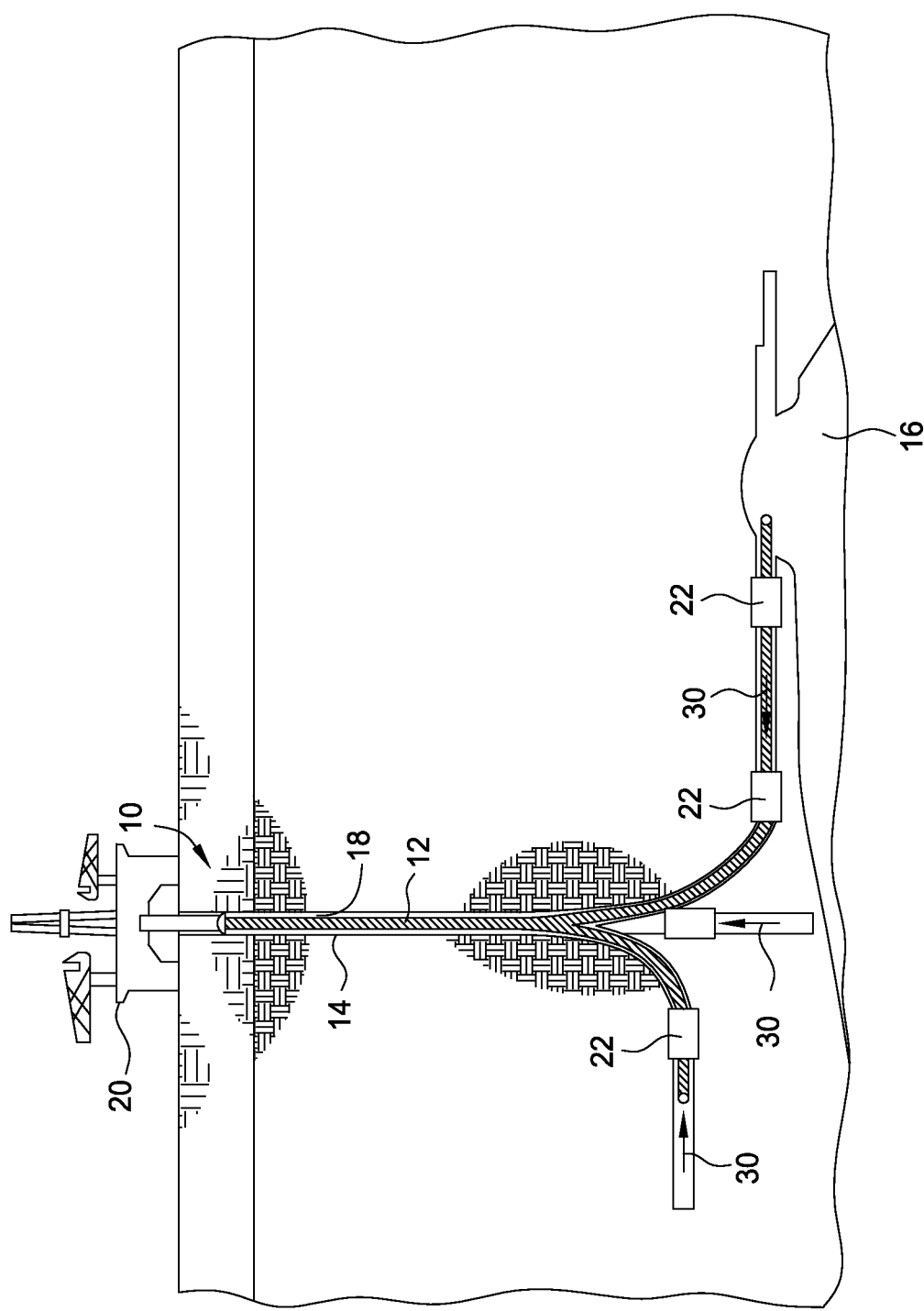
FIG. 1 illustrates a diagrammatic view of a well having a pipe inside a casing and downhole tools positioned at various locations along the pipe, according to an embodiment of the present invention.

Referring to FIG. 1, there is shown an oil well system 10 containing one or more production pipes 12 (also known as production tubing) that may extend downward through a casing 14 to one or more hydrocarbon sources 16 (e.g., reservoirs). An annulus 18 may exist between the pipe 12 and the casing 14. Each production pipe 12 may include one or more lateral sections that branch off to access different hydrocarbon sources 16 or different areas of the same hydrocarbon source 16. The fluid mixture may flow from sources 16 to the platform 20 through the production pipes 12, as indicated by fluid flow 30. The production pipe 12 may comprise one or more tools 22 for performing various tasks (e.g., sensing parameters such as pressure or temperature) in, on, or adjacent a pipe or other conduit as the fluid mixtures flow through the production pipes 12. The tools 22 may be any type of power-consuming downhole device. For example, the tools 22 may include a flow control device (such as a valve), a sensor (such as a pressure, temperature or fluid flow sensor) or other instrument, an actuator (such as a solenoid), a data storage device (such as a programmable memory), a communication device (such as a transmitter or a receiver), etc.

Each tool 22 may be incorporated into an existing section of production pipe 12 or may be incorporated into a specific pipe section that is inserted in line with the production pipe 12. The distributed scheme of tools 22 shown in FIG. 1 may permit an operator of the well system 10 to determine, for example, the level of depletion of the hydrocarbon reservoir. This information may permit the operator to monitor and intelligently control production of the hydrocarbon reservoir.

The oil well system 10 may include a power source for providing electrical power to operate the tools 22. For some embodiments, each tool 22 may include a separate power source. As described above, in production monitoring applications, there are various sensors that are reporting reservoir parameters (e.g., pressure and temperature) every so often to evaluate the level of depletion. In many cases, these sensors may be expected to transmit data for a long period of time (e.g., around 10-20 years), depending on the life of the producing well. Typically, batteries for powering the sensors may last up to 2 years, or up to 5 years may be achieved with an optimized data sampling rate and power management scheme. In other traditional applications, electrical wires and/or cable(s) may be run down to the sensors, and the power may be provided from the surface. However, providing power from the surface may be costly, and the wires may most likely be replaced at certain planned intervals due to wear.

Embodiments of the present invention provide solutions for continuously powering tools (e.g., sensors) downhole for extended periods, such as for the life of the producing well. One example system generally includes a series of reserve batteries which have an extended shelf life (e.g., around 20 years), where the reserve batteries may be instantaneously activated at least one at a time when an electrolyte is poured in place, for example, between the anode and cathode of a reserve battery. The system may be used in a chain reaction, i.e., when one battery approaches the fully discharged state, a sub-system may trigger the release of electrolyte into the chamber of the anode and cathode of another reserve battery. By doing so, the other reserve battery may become active and be the primary source of power for the sensors. The process may be repeated until the shelf life of the reserve batteries is reached (e.g., around 20 years).

A reserve battery, also called a stand-by battery, is a battery where a portion of the battery (e.g., the anode and the cathode) may be isolated until the battery is to be used. When long storage (e.g., several years) is desired, reserve batteries may be preferred over other batteries, since the active chemicals of the cell are segregated until the reserve battery is intended to be used, thus reducing self-discharge.

Reserve batteries may be activated, as examples, by the addition of a substance (e.g., water or an electrolyte), by introducing a gas into the cell that is either the active cathode material or part of the electrolyte, or by heating a solid electrolyte to a temperature at which the electrolyte may become conductive. The missing element of the battery may be added before use in several ways. The battery may have the water or electrolyte added manually, the battery may be activated when the system is dropped into water (e.g., as in a sonobuoy), or the electrolyte may be stored in a capsule within the battery and released by, for example, mechanical means, an electrical trigger, or by spin or shock. A molten-electrolyte battery may be activated, for example, by igniting a pyrotechnic heat source.

The battery may be designed to deliver current for a short period of time (e.g., seconds to a few minutes), but some reserve batteries may be stored 10 years or more without deterioration. The reserve batteries may consist of any of various suitable materials, such as lithium oxyhalide or lithium sulfuryl chloride, among others. Utilizing a series of reserve batteries for powering tools downhole may avoid the replacement of batteries for an extended period of time, and is safe, simple, and cost-effective for reasons discussed above.

For some embodiments, rechargeable batteries may be utilized downhole to provide power to operate the tools 22. However, rather than retrieving the rechargeable batteries to the surface for recharging, the reserve batteries described above may be used for recharging, as described further below.

Figure 2:
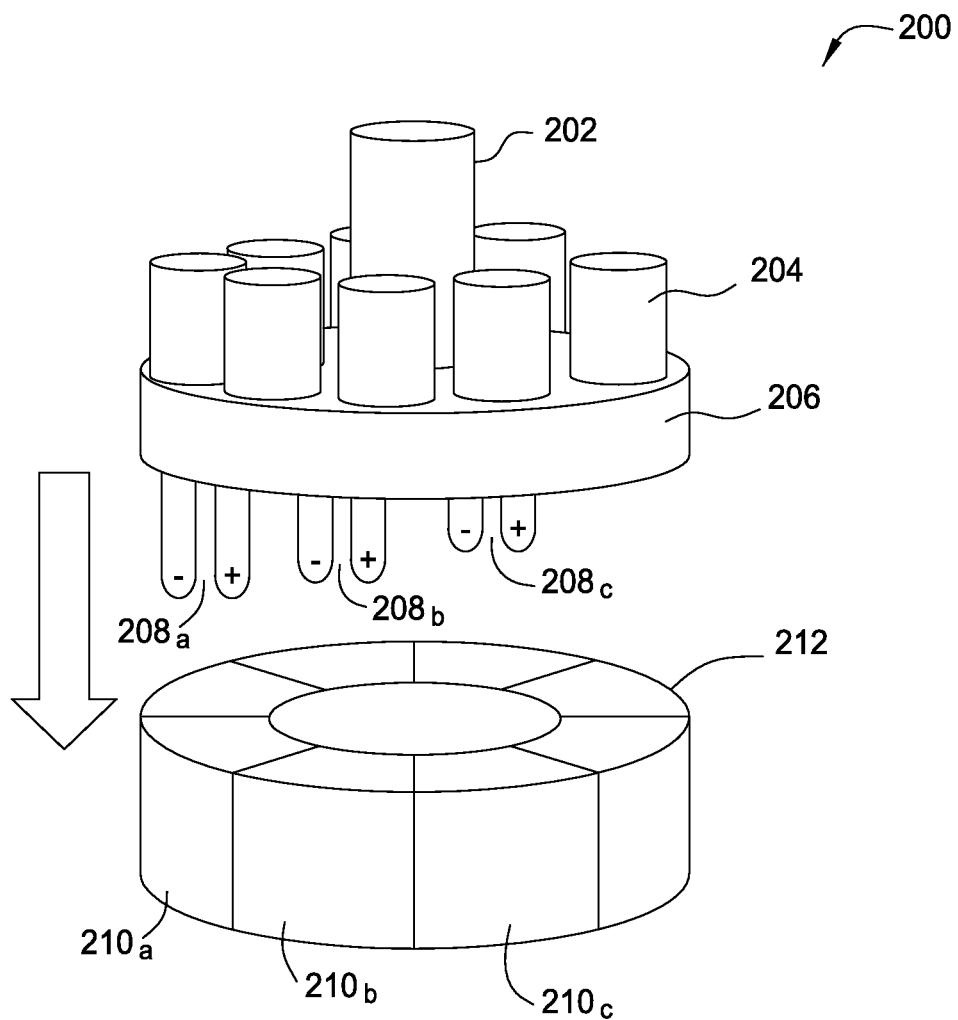
FIG. 2 illustrates a long-lasting power source for providing electrical power to operate downhole tools, according to an embodiment of the present invention.

FIG. 2 illustrates a long-lasting power source 200 for providing electrical power to operate downhole tools, according to an embodiment of the present invention. The power source 200 may include rechargeable batteries 204 coupled with a series of reserve batteries. One portion of the reserve batteries may include an electrolyte container 212. As described above, the remaining portion of the reserve batteries, such as the electrodes 208 of each reserve battery, may be isolated from the electrolyte container 212 until one or more of the reserve batteries are intended to be used for recharging the rechargeable batteries 204. The container 212 may be compartmentalized into capsules 210 (i.e., compartments) for accommodating the respective electrodes 208 of each reserve battery. As described above, each downhole tool may include a separate power source 200. The power source 200 may be fitted on the production pipe of the well system in conjunction with the downhole tool.

Upon identification of a power-related parameter of the rechargeable batteries 204 dropping below a predefined threshold, at least one of the reserve batteries may be activated (using any of the methods described above), providing enough power to recharge a specific battery pack of the rechargeable batteries 204 (unique to each application). Examples of power-related parameters generally include a power density level and state of charge (SOC).

For certain embodiments of the present invention, the power source 200 may include an actuating mechanism 202 for activating the one or more reserve batteries. The reserve batteries may be activated by moving the upper frame 206 closer to the electrolyte container 212 using the actuating mechanism 202 until electrodes 208 of the one or more reserve batteries puncture respective capsules 210 of the container 212. For example, electrodes $208_a$ of a reserve battery may puncture capsule $210_a$ in an effort to activate the reserve battery, as illustrated in FIG. 3A.

Figure 3A:
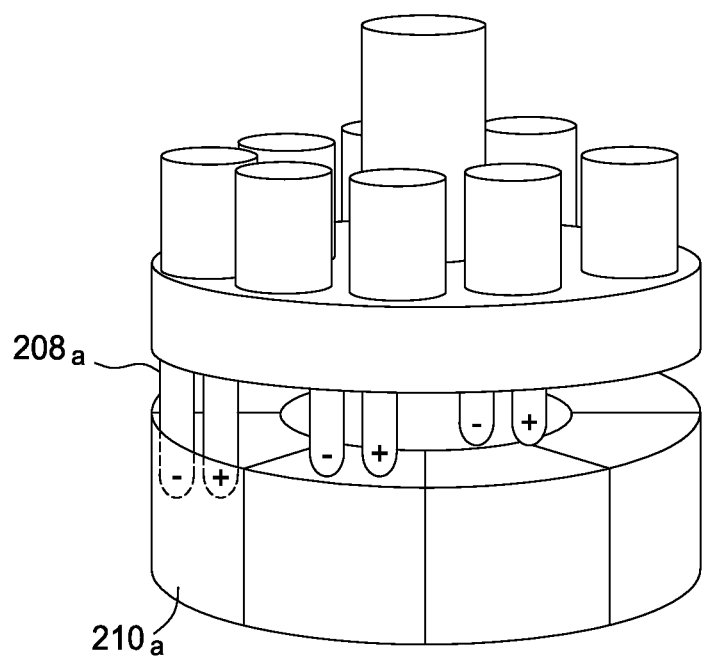
FIGS. 3A-C illustrate the activation of reserve batteries for subsequent recharging of rechargeable batteries, according to embodiments of the present invention.
Figure 3B:
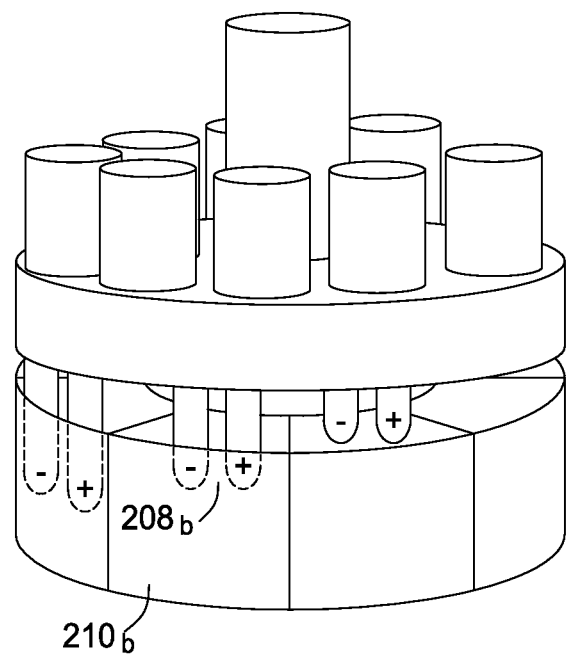
Figure 3C:
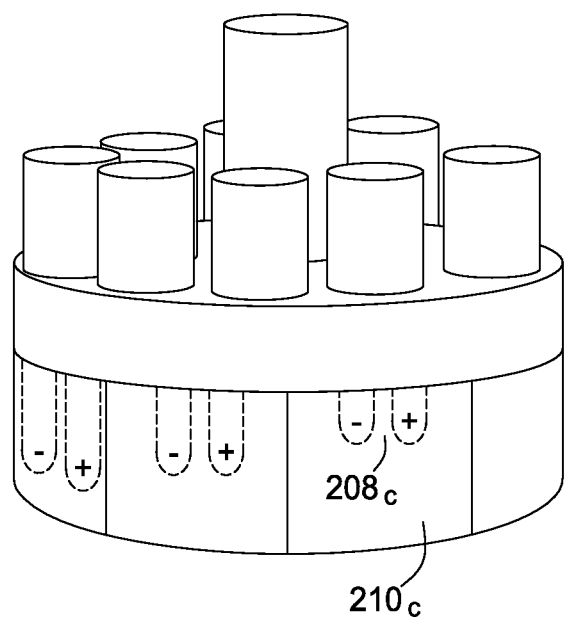

FIGS. 3A-C illustrate the activation of reserve batteries for subsequent recharging of the rechargeable batteries 204, according to embodiments of the present invention. As illustrated in FIG. 2, the electrodes 208 of each reserve battery may be graduated (i.e., staggered) so that each reserve battery may be activated independently. In other words, as the actuating mechanism 202 moves the upper frame 206 closer to the electrolyte container 212, the reserve battery associated with electrodes $208_a$ may be activated independent of the other reserve batteries, as illustrated in FIG. 3A. Thereafter, the reserve battery associated with electrodes $208_b$ may be activated (e.g., by puncturing capsule $210_b$) for a subsequent recharging of the rechargeable batteries 204, as illustrated in FIG. 3B. Finally, the reserve battery associated with electrodes $208_c$ may be activated (e.g., by puncturing capsule $210_c$) for a subsequent recharging of the rechargeable batteries 204, as illustrated in FIG. 3C.

For some embodiments, the electrodes 208 may include a retractable sleeve (not shown) for protecting portions of the electrodes 208 for later use. For example, upon activating the reserve battery associated with electrodes $208_a$, the upper portion of the electrodes $208_a$ may be protected by the retractable sleeve for protecting the upper portion for a later recharging of the rechargeable batteries 204. Although the activation of three reserve batteries is illustrated, the power source 200 may include different amounts of reserve batteries.

For some embodiments, based on the time involved for the downhole tools to function, the size and power of the rechargeable batteries 204 may be designed in conjunction with the reserve battery system to meet the power specification for the time indicated. As a working principle, the rechargeable batteries 204, may power the downhole tools only when in use; otherwise, power consumption, yet very low, may be attributed to operating a microcontroller. The microcontroller may be utilized for monitoring power-related parameters of the rechargeable batteries 204 and activating the reserve batteries.

For some embodiments, the reserve batteries may have a high power output, but only for a limited amount of time (e.g., up to 100 hours). In the event the high power is available for 100 hours or so, the time to recharge the rechargeable batteries 204 may be estimated, and the volume of the electrolyte available for each charging cycle may be estimated. Thus, prior to querying a downhole sensor for data (i.e., before powering up the sensor), the microcontroller may get feedback from a power density monitor as to the remaining life of the rechargeable batteries 204.

If the remaining usable power is below a pre-established threshold, the microcontroller may initiate the actuating mechanism 202, and the upper frame 206 may be lowered into one of the preset positions, as illustrated in FIGS. 3A-C. At that point, the two electrodes of a reserve battery may be fully immersed into the electrolyte, and the reserve battery may be activated and start the recharge process. This may be overseen by the microcontroller as well, by closing a circuit and allowing the power to "flow" towards the rechargeable batteries 204. The actuating mechanism 202 may be controlled by mechanical means (e.g., pressurized cylinder with a release valve, or compressed spring with a step), electrical means (e.g., stepper motor, piezoelectric), electromagnetic means (e.g., solenoid type), chemical means (e.g., exposure to air creates a chemical reaction that generates pressure, similar to the airbag system in cars), gravity, or any other combinations.

The power density monitor may evaluate the charge status of the rechargeable batteries 204 and provide updates to the microcontroller. When fully charged, the microcontroller may transmit this information to a power management system, which may engage the rechargeable batteries 204 to power the tools and function as desired. In other words, the microcontroller may provide autonomous operation for the recharging of the rechargeable batteries 204. For the next recharge cycle, the upper frame 206 may be lowered one increment further towards the electrolyte container 212 and the process may be repeated. The electrolyte container 212 may be compartmentalized, as described above, allowing only one set of electrodes 208 into each capsule 210, and a preset volume within the capsule 210 may yield enough energy for a full recharge cycle.

Activation of the reserve batteries may be initiated in other various ways, different from the way described in FIGS. 3A-C. For example, the actuating mechanism 202 may be coupled to the electrolyte container 212 and move the electrolyte container 212 up to a stationary upper frame 206, thereby activating the reserve batteries by piercing the membrane of the electrolyte container 212. As another example, the container 212 may be disposed on the top, the electrodes 208 may be disposed on the bottom, and the container 212 may be moved down for each subsequent pair of electrodes 208 to pierce the container's membrane in the corresponding reserve battery, thereby allowing the electrolyte to flow over the electrodes 208 and start the reaction. As another example, a tab (or other divider) that separates the first electrode (e.g., negative electrode) from the second electrode (e.g., positive electrode) may be pulled or otherwise removed (or punctured), allowing the electrolyte to flow in between the two electrodes, thereby activating a respective reserve battery and starting the recharge process.

These relative vertical orientations of up/down and top/bottom are used only as examples; the components of the power source 200 may also be arranged horizontally or diagonally with respect to the Earth's surface. In other words, the power source 200 may be oriented in any direction and/or actuated in any direction.

Figure 4A:
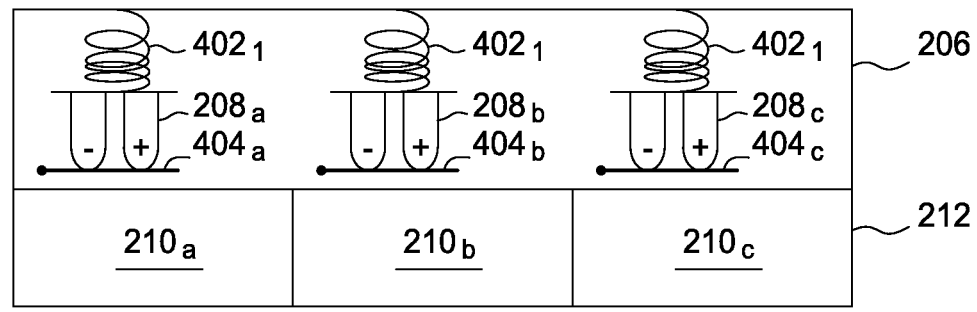
FIGS. 4A-B illustrate the activation of reserve batteries for the recharging of rechargeable batteries, with the use of a mechanism such as a trap door, according to embodiments of the present invention.
Figure 4B:
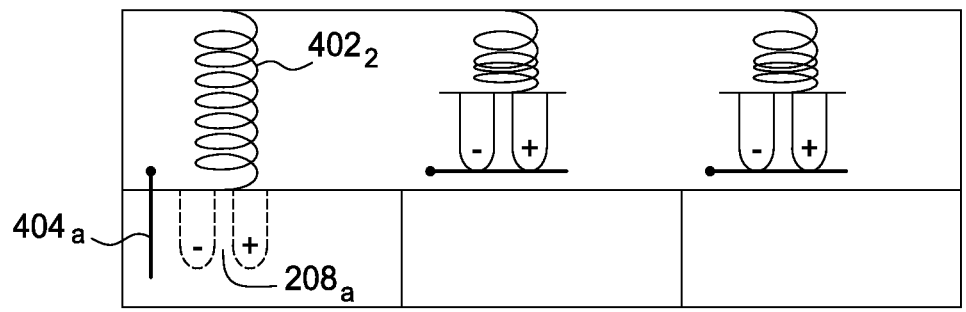

FIGS. 4A-B illustrate the activation of reserve batteries for the recharging of rechargeable batteries, with the use of spring-loaded electrodes, according to embodiments of the present invention. Compared to FIG. 2, the upper frame 206 may remain flush or in close proximity with the electrolyte container 212, and the biased electrodes 208 may be released by another mechanism, such as a trap door 404 or a release (or catch) that otherwise holds the spring-loaded electrodes back from the container 212. The electrodes 208 may be spring-loaded with a spring 402, such that upon release of an electrode 208 by the trap door 404, the spring 402 may extend ($402_2$) from its compressed position ($402_1$).

As illustrated in FIG. 4B, upon the identification of power density levels of the rechargeable batteries 204 dropping below a predefined threshold, the reserve battery associated with electrodes $208_a$ may be activated by releasing trap door $404_a$. When the trap door $404_a$ is released, the spring 402 may force the electrodes $208_a$ into the corresponding compartment 210 of the electrolyte container 212. Upon subsequent recharging of the rechargeable batteries 204, the remaining trap doors $404_b$, $404_c$ may be sequentially released for activating corresponding reserve batteries.

For some embodiments, each electrode of an electrode pair 208 may be independently actuated (not shown). For example, only one electrode of the pair 208 (e.g., the negative electrode) may be released by the trap door 404 while the positive electrode was previously disposed in the corresponding compartment 210 of the electrolyte container 212. In other words, the reserve battery may be activated only upon the release of the negative electrode into the compartment 210.

Figure 5:
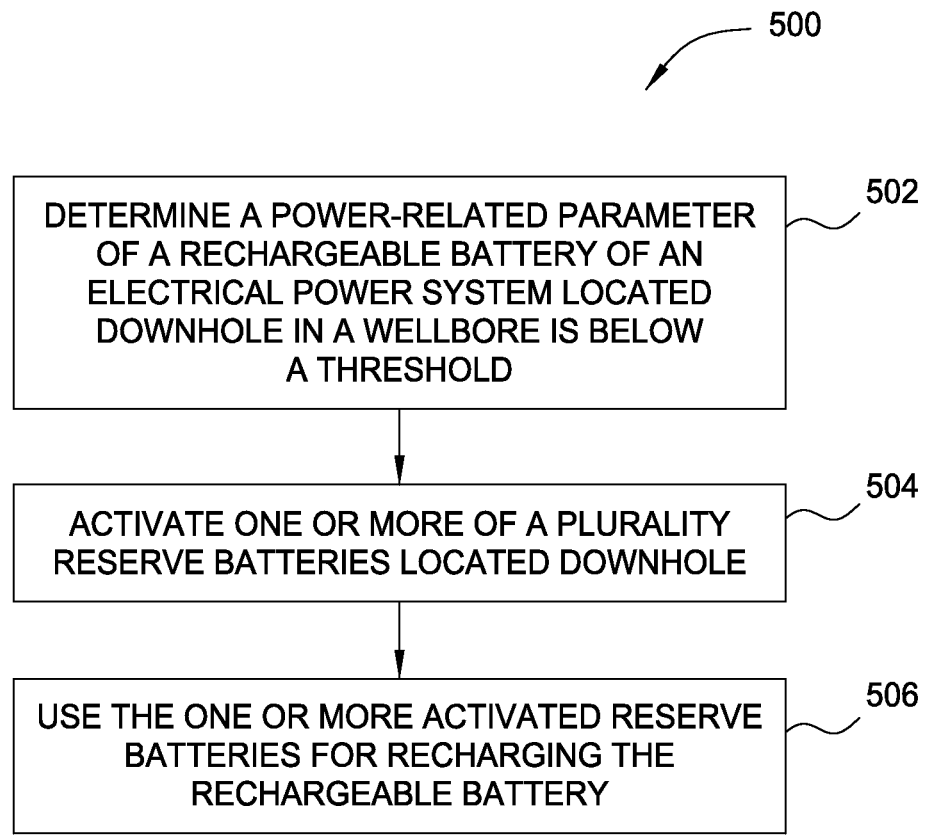
FIG. 5 is a flow diagram of exemplary operations for continuously powering tools downhole for extended periods of time, such as for the life of a producing well, according to an embodiment of the present invention.

FIG. 5 illustrates example operations 500 for continuously powering tools downhole for extended periods of time, such as for the life of a producing well, according to an embodiment of the present invention. The operations 500 may begin at 502 by determining that a power-related parameter (e.g., power density level or SOC) of a rechargeable battery of an electrical power system located downhole in the well is below a threshold.

At 504, one or more of a plurality of reserve batteries located downhole may be activated (as described above) if the power-related parameter of the rechargeable battery is below the threshold. For example, the one or more reserve batteries may be activated by inserting an electrode pair into a compartment containing electrolyte for each of the one or more reserve batteries (e.g., upon at least partial insertion of the electrode pair). For some embodiments, the inserting generally includes moving the electrode pair. For some embodiments, the inserting generally includes moving the compartment containing the electrolyte onto the electrode pair, such that the electrode pair is forced into the compartment. As another example, the one or more reserve batteries may be activated by releasing a biased electrode pair into a compartment containing electrolyte for each of the one or more reserve batteries. For some embodiments, the releasing generally includes opening a trap door associated with the electrode pair.

At 506, the one or more activated reserve batteries may be used for recharging the rechargeable battery. Upon recharging the rechargeable battery, the rechargeable battery may power one or more downhole tools. As described above, one or more other reserve batteries of the plurality of reserve batteries may be used for subsequent recharging of the rechargeable battery. For some embodiments, prior to utilizing the rechargeable battery for powering the one or more downhole tools, a primary battery may be used for powering the one or more downhole tools. A primary battery, as is well known in the art, is a battery in which the electrochemical reaction is not reversible, rendering the primary battery non-rechargeable. Upon determining a power-related parameter of the primary battery is below a threshold, the rechargeable battery may be utilized as described above. Initially utilizing a primary battery for powering the downhole tools may extend the operation life of the downhole tools even further.

Figure 6:
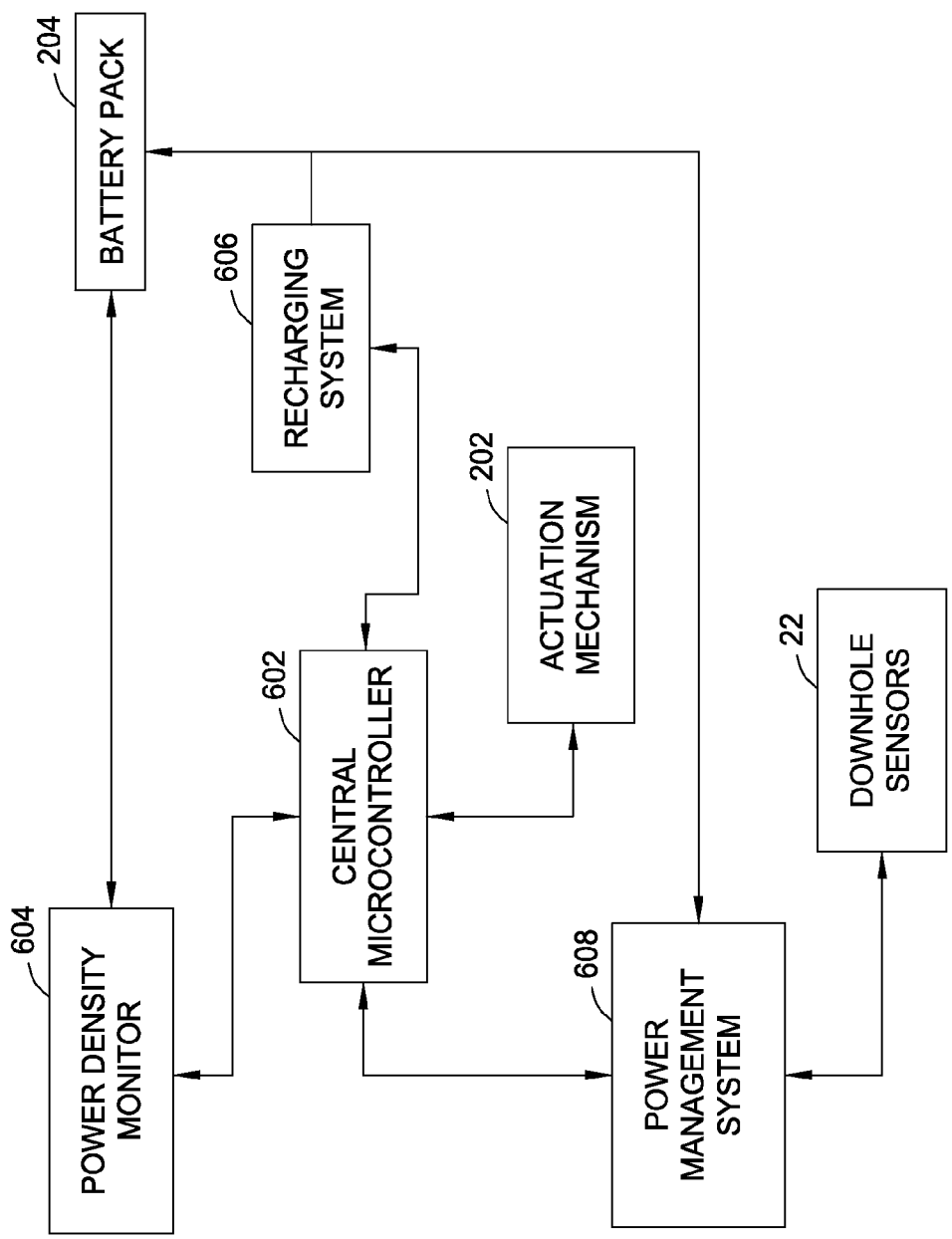
FIG. 6 illustrates a control logic schematic for continuously powering tools located downhole for extended periods of time, such as for the life of a producing well, according to an embodiment of the present invention.

FIG. 6 illustrates a control logic schematic for continuously powering tools downhole for extended periods of time, such as for the life of a producing well, according to an embodiment of the present invention. As described above, a central microcontroller 602 may be utilized for monitoring power-related parameters of a battery pack (e.g., rechargeable batteries 204). For example, the microcontroller 602 may get feedback from a power density monitor 604 as to the remaining life of the rechargeable batteries 204. Upon identification of the power density levels of the rechargeable batteries 204 dropping below a threshold, the microcontroller 602 may initiate an actuation mechanism 202 for activating one or more reserve batteries and recharging the rechargeable batteries 204 via a recharging system 606. Upon recharging the rechargeable batteries 204, the microcontroller 602 may use the rechargeable batteries 204 to power one or more downhole sensors (e.g., tools 22) via a power management system 608.

Embodiments of the present invention provide methods and apparatus for continuously powering tools downhole for extended periods of time, such as for the life of the producing well. As described above, batteries may power the tools, but traditionally, they may last up to 2 years, and in some cases, up to 5 years may be reached with an optimized data sampling rate and power management scheme. After that time, operations may be halted temporarily for replacing the batteries. However, rechargeable batteries may be utilized downhole to provide power to operate the tools and, rather than halting operations and retrieving the rechargeable batteries to the surface for recharging, the reserve batteries described above may be used for recharging the rechargeable batteries. In many cases, these well tools may be designed to operate for a long period of time (e.g., around 10-20 years), depending on the life of the producing well.

While the foregoing is directed to embodiments of the present invention, other and further embodiments of the invention may be devised without departing from the basic scope thereof, and the scope thereof is determined by the claims that follow.

What is claimed is:

1. An electrical power system located downhole in a wellbore, the system comprising:
a rechargeable battery;
a first reserve battery located downhole, wherein active chemicals of the first reserve battery are segregated until the first reserve battery is activated; and
a control unit for monitoring a power-related parameter of the rechargeable battery, wherein the control unit is configured to:
determine the power-related parameter of the rechargeable battery is below a threshold;
activate the first reserve battery; and
use the first reserve battery when activated to recharge the rechargeable battery.

2. The system of claim 1, wherein, upon recharging the rechargeable battery, the control unit is configured to power one or more downhole tools with the rechargeable battery.

3. The system of claim 2, wherein, upon powering the one or more downhole tools, the control unit is configured to:
determine the power-related parameter of the rechargeable battery is below the threshold;
activate a second reserve battery; and
use the second reserve battery when activated to recharge the rechargeable battery.

4. The system of claim 2, further comprising a primary battery, wherein the control unit is configured to:
power the one or more downhole tools with the primary battery prior to powering the tools with the rechargeable battery;
determine a power-related parameter of the primary battery is below a threshold; and
power the one or more downhole tools with the rechargeable battery upon the determination.

5. The system of claim 1, wherein the active chemicals of the first reserve battery comprise:
a pair of electrodes; and
an electrolyte for activating the first reserve battery upon at least partial insertion of the pair of electrodes into the electrolyte.

6. The system of claim 5, wherein the electrolyte is disposed in an electrolyte container that is compartmentalized into capsules for accommodating additional reserve batteries each having a pair of electrodes.

7. The system of claim 6, wherein the pair of electrodes for each reserve battery is graduated for activating each reserve battery independently.

8. The system of claim 7, further comprising an actuating mechanism for activating each reserve battery independently.

9. The system of claim 8, wherein the actuating mechanism is controlled by at least one of mechanical means, electrical means, electromagnetic means, chemical means, or gravity.

10. The system of claim 6, wherein each of the reserve batteries is activated by releasing respective electrodes into the electrolyte disposed in the electrolyte container.

11. The system of claim 10, wherein at least one of the respective electrodes are released into the electrolyte container via a trap door.

12. The system of claim 5, wherein the first reserve battery is activated by removing a tab that separates a first electrode from a second electrode of the pair of electrodes.

13. The system of claim 1, wherein the power-related parameter comprises a power density level.

14. A method, comprising:
determining a power-related parameter of a rechargeable battery of an electrical power system located downhole in a wellbore is below a threshold;
activating a first reserve battery located downhole, wherein active chemicals of the first reserve battery are segregated until the first reserve battery is activated; and
using the first reserve battery when activated to recharge the rechargeable battery.

15. The method of claim 14, further comprising:
upon recharging the rechargeable battery, powering one or more downhole tools with the rechargeable battery.

16. The method of claim 15, further comprising:
upon powering the one or more downhole tools, determining the power-related parameter of the rechargeable battery is below the threshold;
activating a second reserve battery; and
using the second reserve battery when activated to recharge the rechargeable battery.

17. The method of claim 15, further comprising:
powering the one or more downhole tools with a primary battery prior to powering the tools with the rechargeable battery;
determining a power-related parameter of the primary battery is below a threshold; and
powering the one or more downhole tools with the rechargeable battery upon the determination.

18. The method of claim 14, wherein the active chemicals comprise an electrode pair and an electrolyte, and wherein the activating comprises inserting the electrode pair into a compartment containing the electrolyte.

19. The method of claim 18, wherein the inserting comprises moving the electrode pair.

20. The method of claim 18, wherein the inserting comprises moving the compartment containing the electrolyte onto the electrode pair, such that the electrode pair is forced into the compartment.

21. The method of claim 14, wherein the active chemicals comprise a biased electrode pair and an electrolyte, and wherein the activating comprises releasing the biased electrode pair into a compartment containing the electrolyte.

22. The method of claim 21, wherein the releasing comprises opening a trap door associated with at least one electrode of the biased electrode pair.

23. The method of claim 14, wherein the power-related parameter comprises a power density level.

24. An electrical power system located downhole in a wellbore, the system comprising:
a first reserve battery located downhole;
an actuating mechanism configured to activate a second reserve battery located downhole; and
a control unit, wherein the control unit is configured to:
power a downhole tool with the first reserve battery;
determine a power-related parameter of the first reserve battery is below a threshold;
actuate the actuating mechanism to activate the second reserve battery; and
power the downhole tool with the second reserve battery when activated.

25. The system of claim 24, wherein the reserve batteries comprises:
a pair of electrodes for each reserve battery; and
an electrolyte container containing an electrolyte for activating the reserve batteries upon at least partial insertion of the pair of electrodes into the electrolyte.

26. The system of claim 25, wherein the electrolyte container is compartmentalized into capsules for accommodating respective reserve batteries.

27. The system of claim 25, wherein the pair of electrodes for each reserve battery is graduated for activating each reserve battery independently.

28. The system of claim 24, wherein the actuating mechanism alters a disposition to activate the second reserve battery.

29. The system of claim 28, further comprising:
a pair of electrodes for each reserve battery; and
an electrolyte container containing an electrolyte;
wherein the disposition is altered by at least partial insertion of the pair of electrodes in the electrolyte.

30. The system of claim 24, wherein the actuating mechanism releases a biased electrode pair into a compartment containing an electrolyte to activate the second reserve battery.

31. The system of claim 1, wherein the active chemicals comprise a pair of electrodes and a solid electrolyte, and wherein the active chemicals are segregated until the solid electrolyte is heated to a temperature at which the solid electrolyte becomes conductive.

* * * * *